United States Patent [19]
Waring

[11] Patent Number: 5,393,176
[45] Date of Patent: Feb. 28, 1995

[54] TUBE BEVELLING MACHINE WITH ADJUSTABLE BEVELLING HEAD

[75] Inventor: Tom Waring, Cambridge, Canada

[73] Assignee: The Babcock & Wilcox Company, New Orleans, La.

[21] Appl. No.: 188,530

[22] Filed: Jan. 26, 1994

[51] Int. Cl.$^6$ .................... B23B 41/00; B23B 51/00
[52] U.S. Cl. ..................... 408/105; 82/113; 408/182; 408/224
[58] Field of Search ............... 408/103, 104, 105, 107, 408/108, 128, 203.5, 702, 153, 181, 182, 185, 189, 194, 223, 224; 82/113

[56] References Cited

U.S. PATENT DOCUMENTS

| | | | |
|---|---|---|---|
| 2,599,155 | 6/1952 | De Bogart | 408/128 |
| 3,304,597 | 2/1967 | Keyran | 408/224 |
| 3,486,401 | 12/1969 | Kelm | 408/181 |
| 3,494,254 | 2/1970 | Barfred | 408/107 |
| 4,006,995 | 2/1977 | Gruner | 408/181 |
| 4,405,268 | 9/1983 | Abe | 408/182 |
| 4,739,682 | 4/1988 | Birkestrand | 408/108 |

FOREIGN PATENT DOCUMENTS

| | | | |
|---|---|---|---|
| 2746232 | 4/1979 | Germany | 408/223 |
| 3405890 | 8/1985 | Germany | 82/113 |
| 2106819 | 4/1983 | United Kingdom | 408/104 |

Primary Examiner—Daniel W. Howell
Attorney, Agent, or Firm—Daniel S. Kalka; Robert J. Edwards

[57] ABSTRACT

A portable, hand-held bevelling device for providing a bevel on both the exterior and an interior of a tube comprises a housing having an interior and an upper extended portion and a lower extended portion. The upper extended portion is spaced a distance away from the lower extended portion for defining a space. A hydraulic clamp is located on the exterior of the housing and comprises an upper clamp portion provided on the upper extended portion of the housing and a lower clamp portion provided on the lower extended portion of the housing for hydraulically clamping a tube. A bevelling head having cutters for providing the interior and external bevels on the tube is contained within the interior of the housing and is extendable through the space between the upper extended portion and the lower extended portion toward the exterior clamp. The bevelling head is connected to a movable shaft located within the housing wherein both the head and the shaft are rotated by an air motor and a drive belt. The shaft and head are extended within the housing through bearings and a gear box which is openly controlled by a hand-operated feed wheel located at an exterior of the housing.

13 Claims, 3 Drawing Sheets

TUBE BEVELLING MACHINE WITH ADJUSTABLE BEVELLING HEAD

BACKGROUND OF THE INVENTION

1. Field of the Invention

The present invention relates in general to bevelling machines and in particular to a new and useful portable device having an adjustable bevelling head for bevelling tubes.

2. Description of the Related Art

In the welding field, the current method for machining weld preps on the ends of tubes is to use a tube beveller which is a small, air powered tool having high speed steel cutters. These known tube bevellers are clamped to tubes through the use of an internal mandrel. These machines are typically light duty machines utilizing low power because they are intended for only limited production use, particularly, during the refurbishment of boilers.

In many instances, the refurbishing of a boiler requires the joining of tubes through welding. In order to ensure the quality of the field welded joints used, the weld preps, i.e. the tube bevels, must be machined with uniform, consistent diameters. The known bevellers use cutters which are normally adjusted with set screws. The set screws are difficult to adjust accurately and tend to drift easily from the desired setting. In addition, the high speed steel cutters must be reground frequently. Each regrinding operation requires an additional setup.

Generally, during a tube bevelling operation, the tube bevellers are clamped to the tube with an internal mandrel which passes through the center of the bevel machine. Because of the location of the mandrel, the size of the mandrels is limited. Because of the limited size of the mandrel, breakage of the mandrel is a common occurrence.

In an effort to reduce manufacturing time during a tube bevelling operation, an internal bevel is produced simultaneously with an outside bevel for the tube. Consequently, the internal mandrel, described above, greatly restricts the use of the internal cutters of known bevellers which necessitates an additional hand reaming operation. This additional manual step requires significant labor and greatly reduces the accuracy and consistency of the bevel.

SUMMARY OF THE INVENTION

The present invention pertains to tube bevelling machines and comprises a portable, bevelling device for providing a bevel on both the exterior and the interior of a tube or pipe. The present invention is a bevelling device comprising a housing having an interior and an upper extended portion and a lower extended portion. The upper extended portion is spaced a distance away from the lower extended portion for defining a space.

A hydraulic clamp is located on the exterior of the housing. The clamp comprises an upper clamp provided on the upper extended portion of the housing and a lower clamp provided on the lower extended portion of the housing for hydraulically clamping a tube.

A bevelling head having cutters for providing interior and external bevels on the tube is contained within the interior of the housing. The bevel head is extendable through the space between the upper extended portion and the lower extended portion toward the exterior clamp. The bevelling head is connected to a movable shaft located within the housing wherein both the head and the shaft are rotated by an air motor and a drive belt. The shaft and head are extended within the housing through bearings and a gear box which is operatively controlled by a hand-operated feed wheel located at an exterior of the housing.

It is an object of the present invention to provide a device for bevelling tubes which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
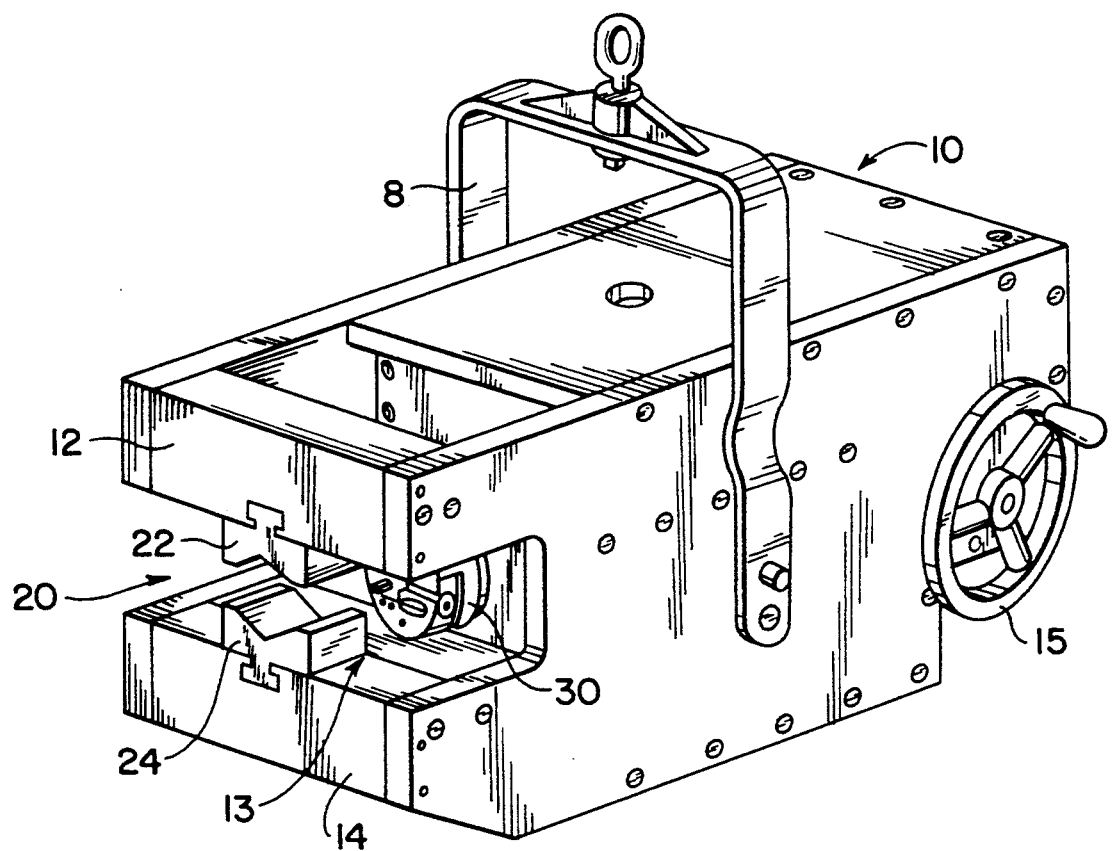
FIG. 1 is a perspective view of the present invention.

The present invention pertains to bevelling machines for providing a bevel on both the interior and exterior of a tube. Referring to FIG. 1, the present invention is a tube beveler comprising an aluminum housing 10 having a carrier handle 8 for portability purposes. The housing 10 has an upper extended portion 12 and a lower extended portion 14 and a space 13 between the upper portion 12 and the lower portion 14. An external hydraulic clamp, generally designated 20, comprising an upper clamp portion 22 on the upper portion 12 of the housing 10 and a lower clamp portion 24 on the lower portion 14 of the housing 10 is used to hydraulically clamp a tube by grabbing and holding the tube in a correct position for bevelling.

A bevelling head 30 is contained within the space 13 in the housing 10 between the upper portion 12 and the lower portion 14. A feed wheel 15 located at an exterior of the housing 10 is used to advance and extend the head 30 within the space 13. The extension and movement of the head 30 will be described in much greater detail later on.

Figure 2:
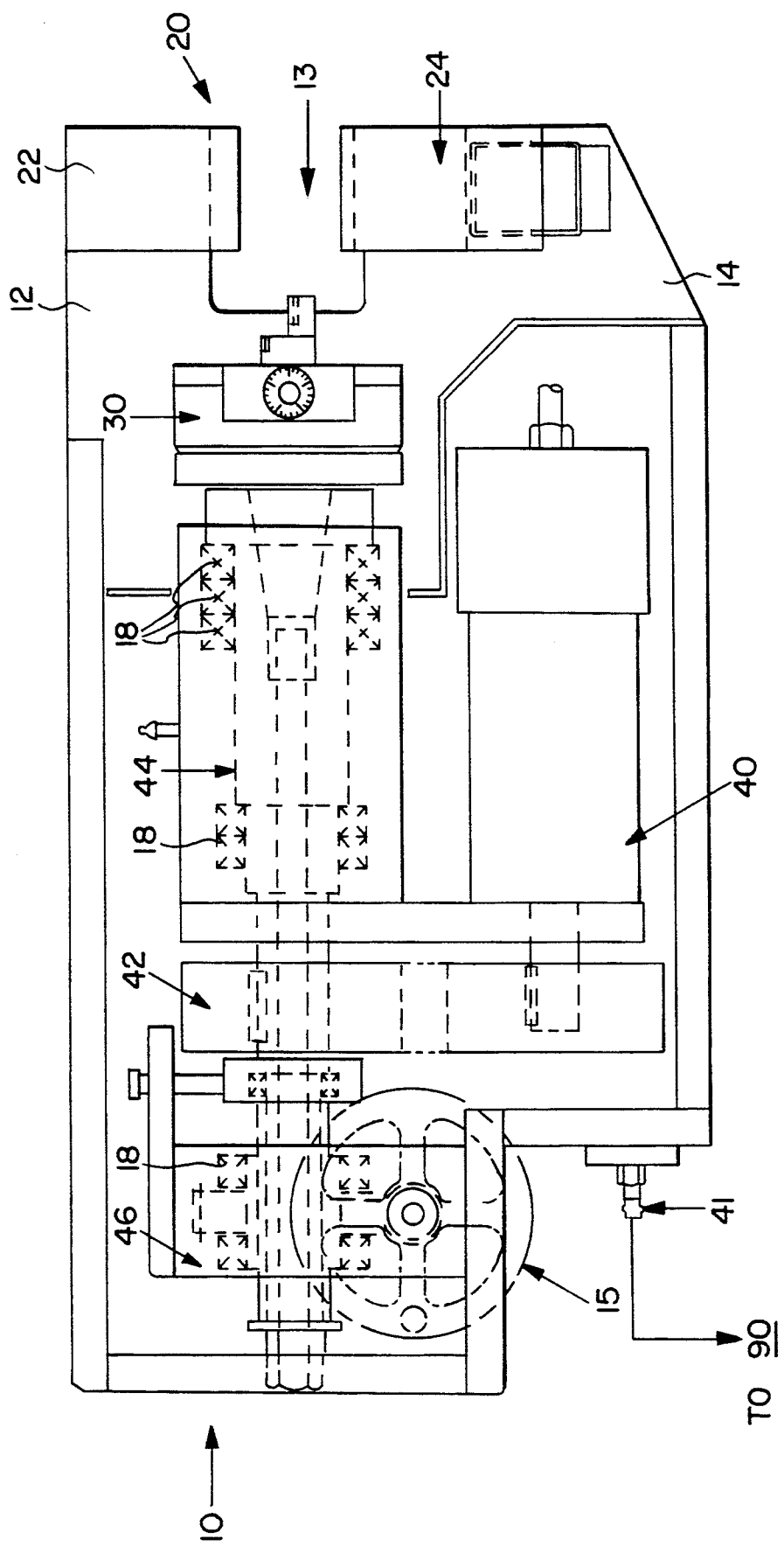
FIG. 2 is a schematic view of the bevelling device of FIG. 1.

Referring to FIG. 2, the bevelling head 30 is aligned with the clamp 20. The head 30 is mounted to a drive shaft 44 which is contained within an interior of the housing 10. The power shaft is mounted on slide bearings 18 contained within the interior of the housing 10 for facilitating movement of the shaft 44 within the housing 10. An air motor 40 is located below the shaft 44 and is coupled to the shaft 44 via a drive belt 42 which engages the shaft 44 and the air motor 40. The air motor 40 is driven by air provided through air connection 41 from an air source 90 (not shown). Through air motor 40 and drive belt 42, the drive shaft 44 and bevelling head 30 are permitted to rotate for bevelling a tube.

Shaft 44 and bevelling head 30 are extendable in the space 13 toward the clamp 20 through slide bearings 18 and a gear box 46 engaged with the drive shaft 44 at a location opposite the bevelling head 30. Feed wheel 15 communicates with the gear box 46 for protracting and retracting the drive shaft 44 within the housing 10.

Figure 3:
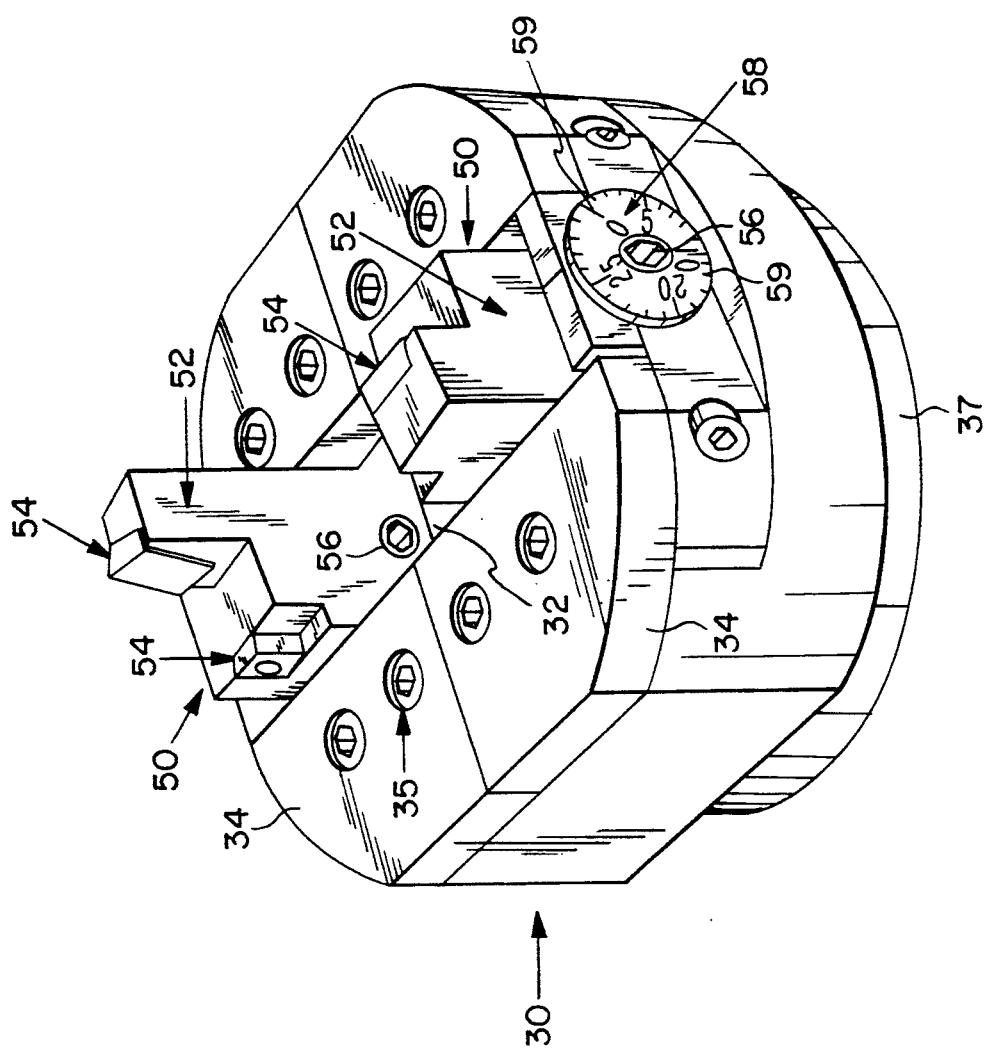
FIG. 3 is a perspective view of a bevelling head of FIG. 1.

FIG. 3 shows the bevelling head 30 as a substantially cylindrical-shaped assembly. Opposite a shaft connection point 37, is a face having a slot 32 thereon. Within the slot 32 are located cutters 50 comprising a cutter holder 52 having at least one cutting surface 54 on the holders 52. The cutting surfaces 54 comprise an insert made of a carbide material for providing an efficient bevel on a tube. FIG. 3 shows two holders 52 positioned within the slot 32 such that the cutting inserts 54 of one holder 52 is positioned opposite the cutting inserts 54 of the second holder 52. The cutters 50 are held in the slot 32 by plates 34 secured to the face of the head 30 by fasteners 35.

The cutters 50 are adjustably movable in the slot 32 by lead screws 56 threaded through each holder 52. Each lead screw 56 has a setting dial 58 which is a disk having calibrations 59 in graduations or increments of 0.001 inches.

Because of the oppositely positioned cutting inserts 54, as described above, one cutter 50 bevels the inside of the tube while the second cutter 50 bevels the outside of a tube. By turning the lead screw 56 of each cutter 50, the exact location of the cutter 50 within the slot 32 is set. This allows the cutters 50 to be set for tubes of various diameters and wall thicknesses. The holders 52 can be fabricated in various configurations to allow for different internal and external bevel angles.

In order to set up the present invention, an operator simply selects the correct insert holders 52 for the inside and outside bevels to be cut on a tube and attaches an insert 54 to each holder 52. The cutters 50 are then mounted on the cutting head 30 and the correct location of each cutter 50 is set using the lead screw 56. Due to the construction of the head 30, the insert holder 52 will not drift during use. The graduations 59 on the disk 58 of the lead screw 56 allow the operator to easily check the present invention to ensure that the adjustment is correct.

When in use, the present invention is suspended on a yoke which holds the unit in a neutral position. The operator moves the unit in order to fit the top clamp 22 over the tube to be bevelled. The bottom clamp 24 is then hydraulically activated with hydraulics (not shown) to firmly hold the tube and the present invention in the correct, relative position. The air motor 40 is engaged to start the head 30 and cutters 50 rotating. The operator then turns the hand wheel 15 to advance the head 30 toward to the tube. The head 30 moves forward and cuts the bevel. The head 30 is then retracted and the air motor 40 disengaged. The hydraulic clamp 20 is then released. The operator is then ready to move to the next tube for performing the beveling operation.

The present invention is designed to clamp externally; and because the external clamp 20 is hydraulic, it is much more powerful and accurate than the internal mandrel used on the known bevel machines.

The bevelling head 30 is micro-adjustable for providing simultaneous cutting of internal and external bevels by using graduations in 0.001 inch increments 59 for each cutter 50 for providing an accuracy which cannot be attained with known set screw adjusting systems.

Also, the bevelling head 30 of the present invention is designed to accept readily available carbide inserts 54. The use of these standard inserts 54 is preferable as it ensures consistent results and eliminates extra setup work associated with the inserts of the known devices where the high speed steel inserts have to be continuously reground.

The bevelling head 30 is very rigid and, when combined with carbide inserts 54, is capable of making extremely aggressive cuts without chattering.

Furthermore, the present invention provides a heavy duty machine, which is portable and manually operated, designed for daily machining of heavy wall tube and pipe.

While specific embodiments of the invention have been shown and described in detail to illustrate the application of the principles of the invention, it will be understood that the invention may be embodied otherwise without departing from such principles.

What is claimed is:

1. A device for bevelling a tube, the device comprising:
    a housing having an interior and an upper extended portion and a lower extended portion, the upper extended portion being spaced a distance away from the lower extended portion for defining a space;
    clamp means on the upper extended portion and the lower extended portion for clamping a tube;
    a rotatable head having at least one cutter adjustably mounted to the head contained within the interior of the housing for bevelling the tube, the rotatable head being extendable through the space between the upper extended portion and the lower extended portion, each cutter having a holder and at least one cutting surface attached to the holder, each cutter being adjustably movable with a lead screw threaded through each holder, and a setting dial for each lead screw; and
    motive means for powering the cutting means.

2. The device according to claim 1, wherein the head has two cutters adjustably mounted to the head.

3. The device according to claim 1, wherein the setting dial has a plurality of calibrations.

4. The device according to claim 1, wherein each calibration is at 0.001 inch increments.

5. The device according to claim 1, wherein the cutting surface of one holder is positioned opposite the cutting surface of a second holder.

6. The device according to claim 5, wherein the head has slot thereon for containing each cutter.

7. The device according to claim 1, wherein the motive means comprises an air motor contained within the interior of the housing.

8. The device according to claim 7, wherein the motive means further comprises a rotatably shaft attached to the head and a drive belt engaging the air motor and the shaft for rotating the shaft.

9. The device according to claim 8, wherein the motive means further comprises gear means engaged with the shaft for extending the shaft and the head through the space between the upper extended portion and the lower extended portion of the housing.

10. The device according to claim 9, wherein the gear means comprises a feed wheel at an exterior of the housing for manually extending the shaft and the head.

11. The device according to claim 10, wherein the motive means further comprises a plurality of bearings at the interior of the housing for moving the shaft.

12. The device according to claim 1, wherein the cutting surface comprises a carbide material.

13. The device according to claim 1, wherein the clamp means comprises a hydraulic clamp.

* * * * *